United States Patent Office 3,579,582
Patented May 18, 1971

3,579,582
HYDROXY AND/OR HYDROCARBYLOXY AND AMINO SUBSTITUTED TETRAHYDRONAPHTHALENES
Ted Symon, Lombard, Ill., assignor to Universal Oil Products Company, Des Plaines, Ill.
No Drawing. Filed Feb. 16, 1967, Ser. No. 616,474
Int. Cl. C07c 91/42
U.S. Cl. 260—574               8 Claims

ABSTRACT OF THE DISCLOSURE

Compounds of the formula

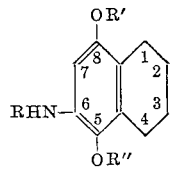

where R, R' and R'' are independently selected from hydrogen, alkyl, aralkyl, aryl, alkaryl or cycloalkyl. The compounds are useful as stabilizing additives in organic substrates such as lube oils, greases and polyolefin plastics.

DESCRIPTION OF THE INVENTION

This invention relates to novel compounds comprising tetrahydronaphthalenes substituted by both hydroxy and/or hydrocarbyloxy and amino groups.

The novel compounds of the present invention are illustrated by the following formula

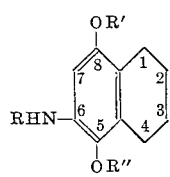

where R, R' and R'' are independently selected from hydrogen, alkyl, aralkyl, aryl, alkaryl or cycloalkyl.

Where R, R' and R'' are hydrogen, the compound is 5,8 - dihydroxy - amino - 1,2,3,4 - tetrahydronaphthalene. Where R is hydrocarbyl, compound is 5,8-dihydroxy-6-hydrocarbylamino-1,2,3,4-tetrahydronaphthalene. In one embodiment, the hydrocarbyl is alkyl, which may contain from 1 to 40 carbon atoms and preferably from 3 to 20 carbon atoms. Illustrative preferred compounds in this embodiment include 5,8-dihydroxy-6-isopropylamino-1,2,3,4-tetrahydronaphthalene,
5,8-dihydroxy-6-sec-butyl-1,2,3,4-tetrahydronaphthalene,
5,8-dihydroxy-6-sec-pentyl-1,2,3,4-tetrahydronaphthalene,
5,8-dihydroxy-6-sec-hexyl-1,2,3,4-tetrahydronaphthalene,
5,8-dihydroxy-sec-heptyl-1,2,3,4-tetrahydronaphthalene,
5,8-dihydroxy-6-sec-octyl-1,2,3,4-tetrahydronaphthalene,
5,8-dihydroxy-6-sec-nonyl-1,2,3,4-tetrahydronaphthalene,
5,8-dihydroxy-6-sec-decyl-1,2,3,4-tetrahydronaphthalene,
5,8-dihydroxy-6-sec-undecyl-1,2,3,4-tetrahydronaphthalene
5,8-dihydroxy-6-sec-dodecyl-1,2,3,4-tetrahydronaphthalene,
5,8-dihydroxy-6-sec-tridecyl-1,2,3,4-tetrahydronaphthalene,
5,8-dihydroxy-6-sec-tetradecyl-1,2,3,4-tetrahydronaphthalene,
5,8-dihydroxy-6-sec-pentadecyl-1,2,3,4-tetrahydronaphthalene,
5,8-dihydroxy-6-sec-hexadecyl-1,2,3,4-tetrahydronaphthalene,
5,8-dihydroxy-6-sec-heptadecyl-1,2,3,4-tetrahydronaphthalene,
5,8-dihydroxy-6-sec-octadecyl-1,2,3,4-
5,8-hydroxy-6-sec-nonadecyl-1,2,3,4-tetrahydronaphthalene,
5,8-dihydroxy-6-sec-eicosyl-1,2,3,4-tetrahydronaphthalene, etc.

Where R is aralkyl, preferred compounds are phenalkyl containing 1 to 3 alkyl groups of from 1 to 20 carbon atoms each. Illustrative compounds in this embodiment include 5,8-dihydroxy-6-sec-benzylamino-1,2,3,4-tetrahydronaphthalene,
5,8-dihydroxy-6-phenylethylamino-1,2,3,4-tetrahydronaphthalene,
5,8-dihydroxy-6-phenylbutylamino-1,2,3,4-tetrahydronaphthalene, etc.,
5,8-dihydroxy-6-(p-alkylbenzylamino)-1,2,3,4-tetrahydronaphthalene,
5,8-dihydroxy-6-(p-alkylphenylethylamino)-1,2,3,4-tetrahydronaphthalene,
5,8-dihydroxy-6-(p-alkylphenylbutylamino)-1,2,3,4-tetrahydronaphthalene, in which the alkyl contains from 1 to 20 carbon atoms, and also including the corresponding o-alkyl and o,p-dialkylphenylalkylamino derivatives.

Where R is aryl, an illustrative compound is 5,8-dihydroxy - 6 - phenylamino - 1,2,3,4 - tetrahydronaphthalene and, where R is alkaryl, illustrative compounds include 5,8-dihydroxy-6-tolylamino-1,2,3,4-tetrahydronaphthalene,
5,8-dihydroxy-6-xylylamino-1,2,3,4-tetrahydronaphthalene,
5,8-dihydroxy-6-diethylphenylamino-1,2,3,4-tetrahydronaphthalene,
5,8-dihydroxy-6-propylphenylamino-1,2,3,4-tetrahydronaphthalene,
5,8-dihydroxy-6-butylphenylamino-1,2,3,4-tetrahydronaphthalene, etc.

Where R is cycloalkyl, illustrative compounds include 5,8-dihydroxy-6-cyclobutylamino-1,2,3,4-tetrahydronaphthalene,
5,8-dihydroxy-6-cyclopentylamino-1,2,3,4-tetrahydronaphthalene,
5,8-dihydroxy-6-cyclohexylamino-1,2,3,4-tetrahydronaphthalene,
5,8,-dihydroxy-6-cyclooctylamino-1,2,3,4-tetrahydronaphthalene,
5,8-dihydroxy-6-cyclononylamino-1,2,3,4-tetrahydronaphthalene,
5,8-dihydroxy-6-cycloundecylamino-1,2,3,4-tetrahydronaphthalene and
5,8-dihydroxy-6-cyclodecylamino-1,2,3,4-tetrahydronaphthalene.

It is understood that the phenyl ring of the aralkyl, aryl or alkaryl groups and/or the cycloalkyl group may contain hydrocarbyl and particularly alkyl group or groups attached thereto. It is further understood that, while the aryl group preferably is phenyl, it may be naphthyl, anthracyl, etc. and this applies to the aralkyl, aryl or alkaryl substituents.

Where R' is hydrocarbyl and R'' is hydrogen, the novel compound is 5-hydroxy-6-amino-8-hydrocarbyloxy-1,2,3,4-tetrahydronaphthalene or the corresponding 6-hydrocarbyl-amino derivatives. R' may contain from 1 to 40 carbon atoms, but preferably contains from 1 to 10 carbon atoms. The hydrocarbylamino groups will be selected from those hereinbefore specifically set forth. Illustrative compounds in this embodiment include 5-hydroxy-6-isopropylamino-8-methoxy-1,2,3,4-tetrahydronaphthalene,
5-hydroxy-6-sec-butylamino-8-methoxy-1,2,3,4,-tetrahydronaphthalene,
5-hydroxy-6-sec-pentyl-amino-8-methoxy-1,2,3,4-tetrahydronaphthalene,
5-hydroxy-6-sec-hexylamino-8-methoxy-1,2,3,4-tetrahydronaphthalene,
5-hydroxy-6-sec-heptylamino-8-methoxy-1,2,3,4-tetrahydronaphthalene,
5-hydroxy-6-sec-octylamino-8-methoxy-1,2,3,4-tetrahydronaphthalene, etc.,
5-hydroxy-6-isopropylamino-8-ethoxy-1,2,3,4-tetrahydronaphthalene,
5-hydroxy-6-sec-butylamino-8-ethoxy-1,2,3,4-tetrahydronaphthalene,
5-hydroxy-6-sec-pentylamino-8-ethoxy-1,2,3,4-tetrahydronaphthalene,
5-hydroxy-6-sec-hexylamino-8-ethoxy-1,2,3,4-tetrahydronaphthalene,
5-hydroxy-6-sec-heptylamino-8-ethoxy-1,2,3,4-tetrahydronaphthalene,
5-hydroxy-6-sec-octylamino-8-ethoxy-1,2,3,4-tetrahydronaphthalene, and corresponding compounds in which the alkoxy group is propoxy, butoxy, pentoxy, hexoxy, heptoxy, octoxy, nonoxy, decoxy, etc., and corresponding compounds in which R is aralkyl, aryl, alkaryl or cycloalkyl and is selected from those hereinbefore set forth.

Where R″ is hydrocarbyl and R′ is hydrogen, the compound is a 5-hydrocarbyloxy-6-amino-8-hydroxy-1,2,3,4-tetrahydronaphthalene or corresponding compounds in which the amino substituent is a hydrocarbylamino substituent and selected from those hereinbefore set forth. Similarly, R″ will be selected from the hydrocarbyl groups specifically set forth hereinbefore. Illustrative compounds in this embodiment include 5-methoxy-6-amino-8-hydroxy-1,2,3,4-tetrahydronaphthalene,
5-methoxy-6-isopropylamino-8-hydroxy-1,2,3,4-tetrahydronaphthalene,
5-methoxy-6-sec-butylamino-8-hydroxy-1,2,3,4-tetrahydronaphthalene, etc.,
5-ethoxy-6-amino-8-hydroxy-1,2,3,4-tetrahydronaphthalene,
5-ethoxy-6-isopropylamino-8-hydroxy-1,2,3,4-tetrahydronaphthalene,
5-ethoxy-6-sec-butylamino-8-hydroxy-1,2,3,4-tetrahydronaphthalene, etc., and corresponding compounds in which the alkoxy group is propoxy, butoxy, pentoxy, hexoxy, heptoxy, octoxy, or is aralkoxy, aryloxy, alkaryloxy or cycloalkoxy selected from those hereinbefore set forth.

Wherein R′ and R″ are hydrocarbyl, the compound is a 5,8-dihydrocarbyloxy-6-amino-1,2,3,4-tetrahydronaphthalene or 5,8-dihydrocarbyloxy-6-hydrocarbylamino-1,2,3,4-tetrahydronaphthalene, the hydrocarbyloxy and hydrocarbyl groups being selected from those hereinbefore set forth. Illustrative compounds in this embodiment include 5,8-dimethoxy-6-isopropylamino-1,2,3,4-tetrahydronaphthalene,
5,8-dimethoxy-6-sec-butylamino-1,2,3,4-tetrahydronaphthalene,
5,8-dimethoxy-6-sec-pentyl-1,2,3,4-tetrahydronaphthalene,
5,8-dimethoxy-6-sec-hexyl-1,2,3,4-tetrahydronaphthalene, etc.,
5,8-dimethoxy-6-benzylamino-1,2,3,4-tetrahydronaphthalene,
5,8-dimethoxy-6-phenylamino-1,2,3,4-tetrahydronaphthalene,
5,8-dimethoxy-6-tolylamino-1,2,3,4-tetrahydronaphthalene,
5,8-dimethoxy-6-cyclohexylamino-1,2,3,4-tetrahydronaphthalene, etc., and corresponding compounds in which R′ and R″ are alkyl of 2 to 20 carbon atoms each or are selected from aralkyl, aryl, alkaryl or cycloalkyl as specifically hereinbefore set forth or mixtures thereof.

In the specific compounds hereinbefore set forth, the alkyl groups attached to the nitrogen are of secondary configuration. These are preferred generally but it is understood that the novel compounds of the present invention also include the normal alkyl derivatives. The preparation of the sec-alkyl as well as of the normal alkyl derivatives is described hereinafter.

The compounds of the present invention may be prepared in any suitable manner. For use as starting material, 5,8 - dihydroxynaphthalene, 5,8 - dihydroxy-1,4,-dihydronaphthalene or 5,8-dihydroxy-1,2,3,4-tetrahydronaphthalene may be obtained from any suitable source or it may be prepared in any suitable manner. In the interest of uniformity, the 5,8-dihydroxynaphthalene is named in this manner, but is also known as 1,4-dihydroxynaphthalene. When it is to be prepared, it may be prepared by the Diels-Alder reaction of butadiene with p-benzoquinone. The p-benzoquinone preferably is dissolved in a suitable solvent as alcohol, benzene, toluene, etc. The reaction readily proceeds at room temperature with the evolution of heat. After the reaction has been completed, the product is purified by recrystallization from organic solvent and then is dissolved in acetic acid and a few drops of hydrobromic acid are added to effect isomerization to the dihydroaromatic structure. When the mono- or dialkoxy derivative is desired, the product then is reacted with a suitable etherification agent including, for example, dimethyl sulfate, diethyl sulfate, etc. This reaction readily is effected in the presence of a suitable base, such as sodium hydroxide, and with intimate stirring. The reaction mixture then is acidified, for example, with sulfuric acid, filtered, dried, and extracted with hot benzene.

The dihydroxy, hydroxyalkoxy or dialkoxy hydronaphthalene then is nitrated in any suitable manner to form the corresponding 6-nitro compound. The nitration is effected; for example by the reaction of the dihydronaphthalene or tetrahydronaphthalene with nitric acid, preferably dissolved in acetic acid, and vigorously stirred. Following completion of the reaction, water is added to precipitate the product, which is recovered by filtration, and then may be water washed and recrystallized from methanol or otherwise.

Either before or after the nitration, the di-(hydroxy and/or alkoxy)-naphthalene may be reduced to the di- or tetrahydro derivative and this may be accomplished in any suitable manner, including reaction with hydrogen in the presence of a nickel or other suitable hydrogenation catalyst. The nitro derivative similarly may be reduced to the amine by reaction with hydrogen in the presence of a nickel or other suitable hydrogenation catalyst. The resulting 6-amino derivative then may be converted to the hydrocarbylamino derivative in any suitable manner. In a particularly preferred method, this is accomplished by reductive alkylation of the amino nitrogen with an aldehyde and preferably with a ketone. For example, the isopropylamino derivative is prepared by reductive alkylation using acetone as the ketone, the sec-butylamino derivative by using methylethyl ketone, the cyclohexyl derivative by using cyclohexanone, etc. The normal alkyl derivatives are prepared by using an aldehyde. The reductive alklation is effected in any suitable manner and, in a preferred method, the reaction is effected in the presence of from 10 and preferably from 50 to 200 atmospheres of hydrogen at a temperature of from 120° to 250° C. and in the presence of a reductive alkylation catalyst. The reductive alkylation catalysts include those containing nickel, molybdenum, platinum, palladium, etc. A preferred catalyst comprises a composite of alumina and 0.5 to 10% by weight of platinum, which catalyst may or may not contain from about 0.1 to 5% by weight of chlorine and/or fluorine.

In the preparation of the compounds of the present invention, a mixture of compounds may be formed. For example, a mixture containing at least 2 of the dihydroxy, hydroxy, hydrocarbyloxy and the dihydrocarbyloxy derivatives may be formed and, when desired, may be utilized as such without separation of the specific compounds.

Preferred embodiments of the compounds of the present invention are found in compounds having the formula

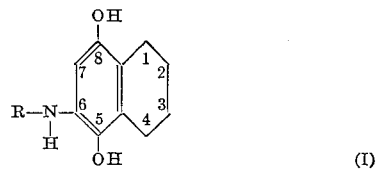

(I)

or

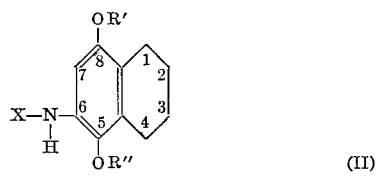

(II)

or

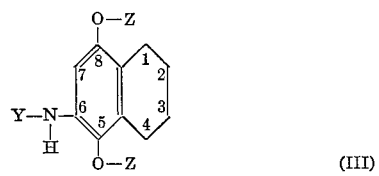

(III)

in which R is selected from the group consisting of hydrogen, sec-alkyl of from 3 to 20 carbon atoms, phenyl-substituted lower alkyl, phenyl, alkylphenyl in which the alkyl groups are 1 or 2 in number and contain from 1 to 4 carbon atoms each, and cycloalkyl having from 4 to 12 carbon atoms in the ring; R' and R" are selected from the group consisting of hydrogen and lower alkyl, one and only one of R' and R" being hydrogen; X is hydrogen or sec-alkyl of from 3 to 8 carbon atoms; Y is selected from the group consisting of hydrogen, sec-alkyl of from 3 to 6 carbon atoms, phenyl, benzyl, tolyl and cyclohexyl; and Z is lower alkyl.

The novel compounds of the present invention will have varied utility. In general, these compounds are useful as additives to retard deterioration of organic substrates which normally tend to deteriorate in storage, transportation and/or in use due to oxidation, ozonation, ultraviolet light absorption and/or other reactions.

In one embodiment, the compounds of the present invention are particularly useful in the stabilization of lubricants including lubricating oils and greases. These may be either synthetic or of petroleum origin. The synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl)-sebacate is being used on a compartively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl)-azelate, di-3,5,5-trimethylhexyl glutarate, di-3,5,5-trimethylpentyl glutarate, di-(2-ethylhexyl)-pimelate, di-(2-ethylhexyl)-adipate, triamyl tricarballylate, pentaerythritol tetracaproate, pentaerythritol tetrapelargonate, dipropylene glycol dipelargonate, 1,5 - pentanediol - di-(2-ethylhexanonate), etc. The polyalkylene oxides include polyisopropylene oxide, polyisopropylene oxide diether, polyisopropylene oxide diester, etc. The silicones include methyl silicone, ethylphenyl silicone, etc. and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters, in which the ester group contains from 3 to 12 carbon atoms or more, and particularly neopentyl glycol propionate, neopentyl glycol butyrate, neopentyl glycol caproate, neopentyl glycol caprylate, neopentyl glycol pelargonate, etc., (2) trialkloyl alkane esters such as the esters of trimethylol alkanes including trimethylolethane, trimethylolpropane, trimethylolbutane, trimethylolpentane, trimethylolhexane, trimethylolheptane, trimethyloloctane, trimethylolnonane, trimethyloldecane, trimethylolundecane, trimethyloldodecane, etc., and particularly triesters in which the ester portions each contain from 3 to 12 carbon atoms and may be selected from those hereinbefore specifically set forth in connection with the discussion of the neopentyl glycol esters, and (3) tricresylphosphate, triphenylphosphate, trioctylphosphate, trinonylphosphate, tridecylphosphate, as well as mixed aryl and alkyl phosphates, etc.

The lubricating oils of petroleum origin include those referred to as motor lubricating oil, railroad type lubricating oil, marine oil, transformer oil, turbine oil, transmission oil, differential oil, diesel lubricating oil, gear oil, cutting oil, rolling oil, cylinder oil, hydraulic oil, slushing oil, specialty products oil, etc.

The synthetic greases generally are referred to as lithium base grease, sodium base grease, calcium base grease, barium base grease, strontium base grease, aluminum base grease, etc. These greases are solid or semi-solid gels and, in general, are prepared by the addition to mineral and/or synthetic oil of hydrocarbon-soluble metal soaps or salts of higher fatty acids as, for example lithium stearate, calcium stearate, aluminum naphthenate, etc. The grease may contain thickening agents such as silica, carbon black, polyacrylates, talc, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

In another embodiment, the novel compounds of the present invention are useful in the stabilization of polyolefins including polyethylene, polypropylene, polybutylene, copolymers of ethylene and propylene, copolymers of ethylene and butylene and copolymers of propylene and butylene, as well as polymers prepared from one or more higher molecular weight olefins. The polyolefins preferably are of high molecular weight, usually having a molecular weight above 1000 and extending into the hundreds of thousand range. The polyolefins may be of the high density, medium density or low density type. Polyethylene is utilized, for example, as a thermoplastic molding or coating agent. Because of its high dielectric strength and its resistance to water, polyethylene is particularly advantageous for use as insulators or dielectrics in condensers and other similar electronic equipment. Polyethylene plastics also are used in many other applications. Polypropylene, polybutylene and copolymers of ethylene, propylene and/or butylene also are used in electronic equipment, as well as many other applications. When the polyolefins are used in outdor exposure, as for example, in lightweight outdoor furniture, cover for greenhouses, awnings, etc., it is additionally desirable that the polyolefin does not undergo discoloration. The polyolefins also are subject to attack by atmospheric oxygen which impairs the desirable properties thereof.

In another embodiment, the compounds of the present invention may be useful in the stabilization of fatty materials including the stabilization of edible fats and oils, which may be of animal, vegetable or mineral origin and which tend to become rancid, especially during long periods of storage prior to use. Typical representatives of edible fats and oils include linseed oil, menhaden oil, cod liver oil, castor oil, olive oil, rapeseed oil, coconut oil, palm oil, corn oil, sesame oil, peanut oil, butter, fat, lard, beef, etc. It is understood that other oils and fats may be treated within the scope of the present invention, including oils and fats which previously have been subjected to various treatments, such as blowing with air, heat treatment, hydrogenation, etc.

In still another embodiment, the compounds may be used in the treatment of crops by dusting or spraying in order to preserve food accessory factors such as carotene, vitamins, various fatty acids, alcohols, etc.

Other organic substances which deteriorate in storage, during treatment and/or in use, include hydrocarbons and particularly motor fuels such as saturated and particularly unsaturated gasoline, blends of unsaturated and saturated gasolines, including cracked gasoline, straight run gasoline, polymer gasoline, coker gasoline, alkylate, etc., as well as jet fuel, diesel oil, mineral oil, fuel oil, residual oil, drying oil, waxes, resins, rubber which may be natural or synthetic, etc. These substances are adversely affected by oxygen, with the resultant formation of undesirable gum, discoloration and/or other deleterious reaction products.

When used as additives in organic substrates, the compounds of the present invention may be used in a concentration of from about 0.001% to about 20% and more particularly from about 0.001% to about 1% by weight of the organic substrate. The exact concentration to be used will depend upon the particular organic substrate being stabilized.

It is understood that the compound of the present invention may be used along with other additives incorporated in the organic substance. For example, in grease it may be used along with higher alcohols, esters, organic amines, polybutene, sulfurized fatty materials, sulfur chlorine compounds, molybdenum disulfide, dyes, perfumed materials, fillers, etc. In lubricating oil, it may be used along with one or more of the above additives and/or viscosity index improver, pourpoint depressor, anti-foaming agent, detergent, lubricity or extreme pressure additive, etc. In polymers, such as polyolefins, the compound is used along with one or more of dyes and/or pigments, anti-static agents, plasticizers, other antioxidants or ultraviolet light stabilizers, etc. In some cases, it may be of advantage to also include a metal deactivator as, for example, disalicylal diamino propane, ethylene diamine tetraacetic acid tetrasodium salt, etc., or to include other additives such as tricresyl phosphate, trialkyl phenols including 2,6-di-tert-butyl-4-methylphenol, 2,4-dimethyl - 6 - tert-butylphenol, alkylated diphenyl amines, phenyl naphthyl amines, dialkyl phenylene diamines, phenothiazine, organic selenium compounds, etc. When desired, the compound of the present invention may be prepared as a mixture with one or more of these other additives and incorporated in this manner in the organic substance.

Also, it is understood that the compound of the present invention may be prepared as a solution in a suitable solvent including hydrocarbons, alcohols, ketones, etc. In some cases, the same solvent used for the compound of the present invention may be used for one or more of the other additives to be incorporated in the organic substance. In another method, the compound of the present invention may be prepared as a stock solution in a small quantity of the organic substance and the stock solution then is incorporated into the major quantity of the organic substance.

The compound of the present invention may be incorporated in the organic substance in any suitable manner and at any suitable stage of preparation. For example, in an organic substance which comprises a mixture of several components as, for example, grease, the compound may be added to one or more of the components of the grease prior to compositing and processing thereof, or it may be added to the mix at any time, preferably before final processing in order to obtain intimate mixing and dissolving of the compound in the grease.

The following examples are introduced to illustrate further the novelty and utility of the present invention, but not with the intention of unduly limiting the same.

EXAMPLE I

This example describes the preparation of 5,8-dimethoxy-6-isopropylamine - 1,2,3,4 - tetrahydronaphthalene. It was prepared from 5,8-dimethoxy - 1,4 - dihydronaphthalene, which also may be named 1,4 - dimethoxy - 5,8-dihydronaphthalene. This compound was first reduced to the tetrahydro derivative by dissolving 100 grams of 5,8-dimethoxy - 1,4 - dihydronaphthalene in 300 cc. of methanol and reducing at 75° C. under 100 atmospheres of hydrogen in the presence of 10 grams of nickel catalyst. The reaction was effected in a rotating autoclave and, after completion of the reaction, the reaction mixture was filtered to remove the catalyst, cooled and the product recrystallized from methanol.

The 5,8 - dimethoxy - 1,2,3,4 - tetrahydronaphthalene, prepared in the above manner, was nitrated by dissolving 50 grams thereof in 150 cc. of glacial acetic acid, cooling to 10° C. and then adding dropwise, with vigorous stirring, 24 grams of 70% nitric acid dissolved in 25 cc. of glacial acetic acid. The stirring was continued for one hour, after which water was added to precipitate the product, which was recovered by filtering and then was washed with water and recrystallized from methanol. The 5,8-dimethoxy - 6 - nitro - 1,2,3,4 - tetrahydronaphthalene was recovered as a solid having a melting point of 73.5–74.5° C. Upon analysis, the product was found to have 60.86% carbon and 6.30% hydrogen, which corresponds to the theoretical of 60.75% carbon and 6.37% hydrogen.

The 5,8 - dimethoxy - 6 - nitro - 1,2,3,4 - tetrahydronaphthalene, prepared in the above manner, was reduced to the corresponding amine by dissolving 54 grams of the nitro derivative in 200 cc. of benzene and reducing at 60° C. under 100 atmospheres of hydrogen in the presence of 5 grams of nickel catalyst. Following completion of the reaction, the product was separated by filtering off the catalyst, evaporating the solvent and distillation. The 5,8 - dimethoxy - 6 - amino - 1,2,3,4 - tetrahydronaphthalene was analyzed and found to have 69.56% carbon and 8.71% hydrogen, which corresponds to the theoretical of 69.54% carbon and 8.27% hydrogen.

The 5,8-dimethoxy - 6 - amino - 1,2,3,4 - tetrahydronaphthalene, prepared in the above manner, was reductively alkylated with acetone by dissolving 30 g. of the amino derivative in 200 cc. of acetone and reacting at 160° C. under 100 atmospheres of hydrogen in the presence of 10 grams of alumina-platinum catalyst. Following completion of the reaction, the catalyst was removed by filtration, excess solvent was evaporated, and 5,8-dimethoxy - 6 - isopropylamino - 1,2,3,4 - tetrahydronaphthalene was recovered as a solid having a melting point of 73–74° C. and, when analyzed, was found to comprise 72.12% carbon and 9.45% hydrogen, which corresponds to the theoretical of 72.25% carbon and 9.30% hydrogen.

EXAMPLE II

The compound of this example is 5,8-diethoxy-6-isopropylamino1,2,3,4-tetrahydronaphthalene and was prepared in substantially the same manner as in Example I except that the 5,8-diethoxy-1,4-dihydronaphthalene was used as starting material and was hydrogenated to the corresponding tetrahydronaphthalene derivative, which then was nitrated, reduced and reductively alkylated with acetone. The 5,8-diethoxy-6-isopropylamino-1,2,3,4-tetrahydronaphthalene was recovered as a solid having a melting point of 52–53° C., 73.39% carbon and 9.90% hydrogen, which corresponds to the theoretical of 73.60% carbon and 9.81% hydrogen.

EXAMPLE III

The compound of this example is 5,8-diethoxy-6-cyclohexylamino-1,2,3,4-tetrahydronaphthalene and was prepared in substantially the same manner as above except that the reductive alkylation was effected by using cyclohexanone. The product was recovered as a liquid having a boiling point of 166–168° C. at 0.3 mm. Hg.

EXAMPLE IV

The compound of this example is 5-hydroxy-6-sec-butylamino-8-ethoxy-1,2,3,4-tetrahydronaphthalene and is prepared in the following manner. Initially 5,8-dihydroxy-1,4-dihydronaphthalene was prepared by reacting one mole of p-benzoquinone in benzene solvent with about 1.2 moles of butadiene at 65° C. in a stainless steel bomb. This resulted in an exothermic reaction, with the temperature rising to 100–130° C. Heating was continued for 2 hours at 100° C. after the exothermic reaction subsided. The reaction mixture then was cooled and transferred to a flask equipped with a mechanical stirrer, to which 80 ml. of acetic acid was added and the mixture was stirred vigorously. Small increments of a 1:1 solution of 48% aqueous HBr and glacial acetic acid mixture was added until the temperature reached 95° C. The reaction mixture was cooled, filtered, washed with cold benzene and dried.

The 5,8-dihydroxy-1,4-dihydronaphthalene, prepared in the above manner, then was added in an amount of 434 g. to 267 g. of sodium hydroxide dissolved in 1.5 liters of water. The mixture was stirred vigorously and 440 g. of ethyl sulfate were added rapidly. The reaction mixture was stirred for one-half hour, acidified with dilute sulfuric acid, cooled, filtered and dried. Extraction with hot benzene separated the monoether from diether formed in reaction. The benzene solution was cooled and the monoethylether crystallized out while the diethylether remained in solution. The monoethylether was filtered, dried and distilled, the monoether having a boiling point of 135–145° C. at 0.3 mm. Hg. After recrystallization from benzene, the monoether had a melting point of 132–136° C.

From the monoether prepared in the above manner, 5-hydroxy - 8 - ethoxy-1,2,3,4-tetrahydronaphthalene was prepared by dissolving the dihydromonoether in ethyl acetate and reducing at 50° C. under 100 atmospheres of hydrogen in the presence of a nickel catalyst. Following completion of the reaction, the catalyst was removed by filtering, the solvent by evaporation, and the 5-hydroxy-8-ethoxy-1,2,3,4-tetrahydroxynaphthalene was recrystallized from benzene and recovered as a solid having a melting point of 124–125° C.

The 5-hydroxy-8-ethoxy-1,2,3,4-tetrahydronaphthalene, prepared in the above manner, is nitrated in the manner hereinbefore set forth. The nitro derivative then is subjected to reductive alkylation with methyl ethyl ketone at a temperature of about 160° C., 100 atmospheres of hydrogen and alumina-platinum catalyst. Following completion of the reaction, 5-hydroxy-6-sec-butylamino-8-ethoxy-1,2,3,4-tetrahydronaphthalene is recovered from the effluent product.

EXAMPLE V

This example illustrates the use of a compound of the present invention as an additive in synthetic lubricating oil. The synthetic lubricating oil used in this example is dioctyl sebacate marketed under the tradename of "Plexol 201."

The lubricating oil was evaluated in accordance with a standard oxygen stability test, in which a 100 cc. sample of the lubricating oil is placed in a bath maintained at 204° C. and air is blown therethrough at a rate of 5 liters of air per hour. The sample of lubricating oil is examined periodically and the time to reach an acid number of 5 is reported. It is apparent that the longer the time required to reach an acid number of 5, the more stable is the sample of lubricating oil. In other words, it takes longer for the more stable oil to deteriorate.

The sample of the dioctyl sebacate without additive, when evaluated in the oxygen stability test described above, develops an acid number of 5 within 9 hours. In contrast, another sample of the dioctyl sebacate containing 1% by weight of 5,8-dimethoxy-6-isopropylamino-1,2,3,4-tetrahydronaphthalene, prepared as described in Example I, did not reach an acid number of 5 until 29 hours.

EXAMPLE VI

This example illustrates the use of a compound of the present invention for the stabilization of polyethylene. The polyethylene used in this example is of high density and is marketed under the tradename of "Fortiflex." In the sample containing additive, the additive was used in a concentration of 0.075% by weight of the polyethylene and was incorporated therein by milling. The samples of polyethylene were evaluated in a method similar to that described by Hawkins, Hansen, Matreyek and Winslow in Rubber Chemistry and Technology, October-November 1959, pages 1164–1170, except that an electrically heated aluminum block rather than an oven was used to maintain the desired temperature. The oxygen absorption of the sample was determined manometrically rather than volumetrically. In this method, samples of the polyethylene weighing about 0.5 g. are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to individual manometers containing mercury and the differential pressure is periodically determined. The Induction Period is taken as the number of hours required to reach a pressure differential of 20 cm. Hg.

A sample of the polyethylene without additive reaches the Induction Period within 7.5 hours. In contrast, a sample of the polyethylene containing 0.075% by weight of 5,8 - dimethoxy-6-isopropylamino-1,2,3,4-tetrahydronaphthalene did not reach the Induction Period for about 35 hours.

EXAMPLE VII

This example illustrates the use of a different compound of the present invention in another sample of the polyethylene described in Example VI. The compound used in this example is 5,8-diethoxy-6-isopropylamino-1,2,3,4-tetrahydronaphthalene, prepared as described in Example II, and was incorporated in another sample of the polyethylene in a concentration of 0.075% by weight and evaluated in the same manner as described in Example VI. The additive served to prolong the Induction Period from the 7.5 hours of the control sample to about 41 hours.

EXAMPLE VIII

This example illustrates the use of 5,8-diethoxy-6-cyclohexylamino-1,2,3,4-tetrahydronaphthalene, prepared as described in Example III, as an inhibitor in grease. The grease is a lithium grease and is prepared by mixing 91% by weight of highly refined lubricating oil with 8% by weight of lithium stearate. The mixture is heated at about 232° C. while agitating the same. Subsequently the grease is cooled while agitating to 160° C. and, at this temperature, 0.3% by weight of the inhibitor is added. Agitation is continued, and the mixture is allowed to cool to about 120° C. and the grease then is further cooled slowly to room temperature.

The stability of the grease is tested according to a modified Norma Hoffmann method, in which a sample of the grease is placed in a bomb and oxygen is charged thereto. The bomb then is heated to 100° C. and the time required for a drop of 5 pounds pressure is taken as the Induction Period.

When evaluated in the above manner, a sample of the grease without inhibitor will have an Induction Period of 9 hours. The sample of the grease containing 0.3% by weight of 5,8 - diethoxy - 6 - cyclohexylamino-1,2,3,4-tetrahydronaphthalene is of considerably longer Induction Period.

This example illustrates the use of a compound of the present invention as an additive in rubber. The compound used in this example is 5,8-dimethoxy-6-cyclohexylamino-1,2,3,4-tetrahydronaphthalene and is incorporated in a concentration of 3% by weight into butadiene-styrene rubber during milling thereof. This serves to retard deterioration of the rubber during storage and use.

EXAMPLE X

This example illustrates the use of the compound of the present invention in gasoline. The gasoline used in this example is a washed, thermally cracked gasoline. To this gasoline is added 0.02% by weight of 5,8-dimethoxy-6-isopropylamino - 1,2,3,4 - tetrahydronaphthalene, prepared as described in Example I, and this serves to considerably prolong the Induction Period of the gasoline.

I claim as my invention:
1. A compound of the formula

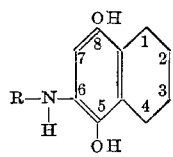
(I)

or

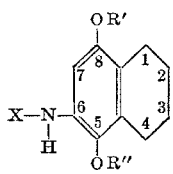
(II)

or

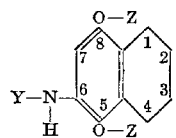
(III)

in which R is selected from the group consisting of hydrogen, sec-alkyl of from 3 to 20 carbon atoms, phenyl-substituted lower alkyl, phenyl, alkylphenyl in which the alkyl groups are 1 or 2 in number and contain from 1 to 4 carbon atoms each, and cycloalkyl having from 4 to 12 carbon atoms in the ring; R' and R" are selected from the group consisting of hydrogen and lower alkyl, one and only one of R' and R" being hydrogen; X is hydrogen or sec-alkyl of from 3 to 8 carbon atoms; Y is selected from the group consisting of hydrogen, sec-alkyl of from 3 to 6 carbon atoms, phenyl, benzyl, tolyl and cyclohexyl; and Z is lower alkyl.

2. The compound of claim 1 having Formula I and R being sec-alkyl of from 3 to 20 carbon atoms.
3. The compound of claim 1 having Formula II and one of R' and R" being methyl.
4. The compound of claim 1 having Formula III and Z being methyl.
5. The compound of claim 1 being 5,8-dimethoxy-6-isopropylamino-1,2,3,4-tetrahydronaphthalene.
6. The compound of claim 1 being 5,8-diethoxy-6-isopropylamino-1,2,3,4-tetrahydronaphthalene.
7. The compound of claim 1 being 5,8 - diethoxy-6-cyclohexylamino-1,2,3,4-tetrahydronaphthalene.
8. The compound of claim 1 being 5 - hydroxy-6-sec-butylamino-8-ethoxy-1,2,3,4-tetrahydronaphthalene.

References Cited
UNITED STATES PATENTS
2,112,899  4/1938  Lott et al. _____ 260—571X
3,347,870  10/1967  Rutschmann _____ 260—571X FOREIGN PATENTS
917,636  9/1954  Germany _____ 260—571

CHARLES B. PARKER, Primary Examiner
C. F. WARREN, Assistant Examiner

U.S. Cl. X.R.
44—72; 99—63; 252—51.5; 260—45.9, 571, 575 570.5